United States Patent
Yamada et al.

[11] Patent Number: 5,959,760
[45] Date of Patent: Sep. 28, 1999

[54] LIGHT BEAM SCANNER USING LARGE ELECTROSTATIC FORCE

[75] Inventors: Keizo Yamada; Toshihide Kuriyama, both of Tokyo, Japan

[73] Assignee: NEC Corporation, Tokyo, Japan

[21] Appl. No.: 09/123,521

[22] Filed: Jul. 28, 1998

[30] Foreign Application Priority Data

Jul. 31, 1997 [JP] Japan ................................. 9-205707

[51] Int. Cl.⁶ ...................................................... G02B 26/08
[52] U.S. Cl. ............................................. 359/224; 359/223
[58] Field of Search ..................................... 359/223, 224, 359/226, 871, 872, 846, 848, 196–199

[56] References Cited

U.S. PATENT DOCUMENTS 4,317,611  3/1982  Petersen .
5,552,924  9/1996  Tregilgas ................................. 359/224

FOREIGN PATENT DOCUMENTS 3-89413  9/1991  Japan .
6-175060  6/1994  Japan .
7-199099  8/1995  Japan .

*Primary Examiner*—James Phan
*Attorney, Agent, or Firm*—McGinn & Gibb, P.C.

[57] ABSTRACT

A light beam scanner includes a supporting substrate. Fixed electrodes of a first set are provided on the supporting substrate to oppose to each other. A mirror is provided between the fixed electrodes, has torsion bars physically connected to the supporting substrate and a mirror electrode section in end portions of the mirror opposing to the fixed electrodes at least. The mirror rotatably vibrates between an upper position of the one fixed electrode and a lower position thereof by torsion force of the torsion bars and electrostatic force due to the voltage using the torsion bars as a rotation axis, when a voltage is applied between one of the fixed electrodes and the electrode section.

16 Claims, 12 Drawing Sheets

LIGHT BEAM SCANNER USING LARGE ELECTROSTATIC FORCE

BACKGROUND OF THE INVENTION

1. Field of the Invention

This invention relates to a light beam scanner to scan a light beam, and more particularly to a light beam scanner in which a small mirror supported by a torsion spring (torsion bar) is vibrated to deflect a light beam.

2. Description of the Related Art

Recently, a light beam scanner to scan a light beam such as a laser beam is used for optical apparatuses such as a bar code reader, a laser printer, a head mount display and so on, or a light input device of an input unit of an infrared camera. One light beam scanner is proposed in which a small mirror is vibrated. The small mirror is formed using the well known silicon micromachining technique.

As such a light beam scanner, a light beam scanner with a silicon micromirror is described in U.S. Pat. No. 4,317,611. FIGS. 1A and 1B are a plan view and a cross sectional view of the conventional example of the light beam scanner. Referring to FIGS. 1A and 1B, a mirror 2 formed of a silicon thin film is arranged in a concave section 1a which is provided for a supporting substrate 1. This mirror 2 is supported by the supporting substrate 1 through torsion bars 3a and 3b which are formed as a unit together with the mirror 2. Therefore, the mirror 2 can be vibrated by torsion of the torsion bars 3a and 3b. Also, the torsion bars 3a and 3b are formed of a conductive material. One end of each of the torsion bars 3a and 3b is electrically connected to a corresponding one of pads which are provided for the supporting substrate 1. Further, fixed electrodes 7a and 7b are supported by an insulating member 6 on both sides of the concave section 1a of the supporting substrate 1. These fixed electrodes 7a and 7b are respectively arranged above both sides of the mirror 2 to oppose to each other with a predetermined gap, e.g. 10 μm to the a plane surface of the mirror 2.

In this light beam scanner, a high voltage of about 500 V is applied between the pad 8a of one of the fixed electrodes 7a and 7b and the pad 4a to connected to the torsion bar 3a, i.e., between the fixed electrode 7a and the mirror 2. As a result, electrostatic force is generated between the fixed electrode 7a and the mirror 2. One end of the mirror 2 is attracted to the side of the fixed electrode 7a by the attractive electrostatic force. The torsion bars 3a and 3b are twisted and deformed through the attracting operation to vibrate the mirror 2 in a counterclockwise direction as shown in the figure. Also, when the application of the high voltage to the fixed electrode 7a is stopped immediately after this a vibrating operation, the mirror 2 is vibrated in a direction opposite to the above direction because of torsion restoration force of the torsion bars 3a and 3b. When a high voltage is applied to the other fixed electrode 7b, the above vibrating operation is performed in the same manner. Therefore, by repeating the application and stop of the high voltage, the mirror 2 is made to vibrate. If a laser beam from a light source out of the figure is reflected by the mirror 2, the laser beam can be deflected and scanned.

In the conventional example of the light beam scanner, the vibration angle of the mirror 2 is limited to the angle position for each of ends of the mirror 2 to collide with the corresponding one of the fixed electrodes 7a and 7b, as shown by θ1 in FIG. 12. As mentioned above, because it is designed in such a manner that the gap distance between the mirror 2 and the fixed electrodes 7a and 7b is about 10 μm, the vibration angle θ1 is generally about 1 degree in maximum, although depending on the size of the mirror. For this reason, the deflection angle when a laser beam is scanned becomes about 2 degrees from the law of reflection.

In such a small deflection angle, however, when a light beam scanner is applied to the above-mentioned barcode reader or laser printer, it is necessary to take a long light traveling length of the laser beam so that the light beam can be scanned in a required length region. This prevents the miniaturization of an optical apparatus.

Also, the resolution of the light beam obtained when the light beam is scanned by the mirror having a predetermined size is proportional to the deflection angle. Therefore, in order to obtain the light beam of the high resolution, it is desirable to make the maximum deflection angle of the light beam large.

For this purpose, it is considered that the gap distance between the mirror 2 and the fixed electrodes 7a and 7b is made large, so that the maximum vibration angle θ1 of the mirror 2 is increased, resulting in increase of the deflection angle.

However, a higher voltage is needed as the voltage applied between the mirror 2 and the fixed electrodes 7a and 7b with increase of this gap distance to generate necessary attractive electrostatic force. Thus, a power supply circuit is made large in size and another problem on the safety occurs.

A piezoelectric light beam scanner is described in Japanese Laid Open Utility Model Application (JP-U-Heisei 3-89413). In this reference, a piezoelectric element is elastically deformed to scan a light beams.

A torsion vibrator is described in Japanese Laid Open Patent Application (JP-A-Heisei 6-175060). In this reference, a mirror is vibrated between the fixed electrodes and is not vibrated beyond the fixed electrode. Therefore, a vibration angle is limited by the distance between the mirror and the fixed electrode.

A two-dimensional light beam scanner is described in Japanese Laid Open Patent Application (JP-A-Heisei 7-199099). In this reference, a mirror is driven by use of a piezoelectric element which is provided in a peripheral portion of the mirror.

SUMMARY OF THE INVENTION

The present invention is accomplished in view of the above problems. Therefore, an object of the present invention is to provide a light beam scanner which can accomplish a large deflection angle with a low applied voltage.

Another object of the present invention is to provide a light beam scanner with a small size.

In order to achieve an aspect of the present invention, a light beam scanner includes a supporting substrate and fixed electrodes of a first set provided on the supporting substrate to oppose to each other. A mirror is provided between the fixed electrodes, has torsion bars physically connected to the supporting substrate and a mirror electrode section in end portions of the mirror opposing to the fixed electrodes at least. The mirror rotatably vibrates between an upper position of the one fixed electrode and a lower position thereof by torsion force of the torsion bars and electrostatic force due to the voltage using the torsion bars as a rotation axis, when a voltage is applied between one of the fixed electrodes and the electrode section.

The mirror and the fixed electrodes of the first set are desirably arranged in a plan view such that the mirror and the fixed electrodes do not overlap. Thus, a shape of each of the end portions of the mirror and a shape of the opposing one of the fixed electrodes of the first set are determined such that a capacity between the end portion and the opposing fixed electrode can be made larger. For instance, each of the end portions of the mirror and each of the fixed electrodes of the first set have comb shapes.

The fixed electrodes of the first set may be provided to have lower surfaces higher than an upper surface of the mirror when no voltage is applied between the electrode section of the mirror and the fixed electrodes of the first set.

Alternatively, one of the fixed electrodes of the first set may be provided to have a lower surface higher than an upper surface of the mirror, when no voltage is applied between the electrode section of the mirror and the fixed electrodes of the first set.

Instead of the above, or in addition to the above, one of the fixed electrodes of the first set may be provided to have an upper surface lower than a lower surface of the mirror, when no voltage is applied between the electrode section of the mirror and the fixed electrodes of the first set.

The end portions of mirror may extend upward.

The light beam scanner may further include fixed electrodes of a second set provided to the supporting substrate to have upper surfaces lower than a lower surface of the mirror when no voltage is applied between the electrode section of the mirror and the fixed electrodes of the second set. In this case, the voltage is applied between the electrode section of the mirror and one of the fixed electrodes of the first set and one of the fixed electrodes of the second set opposing to the one fixed electrode of the first set.

The light beam scanner may further include another supporting substrate having fixed electrodes of a third set provided on the other supporting substrate to oppose to each other. The supporting substrate is provided between the fixed electrodes of the third set. Also, the supporting substrate further include a substrate electrode section in end portions of the supporting substrate opposing to the fixed electrodes of the third set at least, and second torsion bars extending in a direction perpendicular to the torsion bars. Thus, the supporting substrate rotatably vibrates between upper and lower positions of the fixed electrodes of the third set by torsion force of the second torsion bars and electrostatic force due to a voltage applied between the substrate electrode section and the fixed electrodes of the third set. In this case, the supporting substrate and the fixed electrodes of the third set are desirably arranged in a plan view such that the supporting substrate and the fixed electrodes of the third set do not overlap.

The light beam scanner may further Include a voltage applying unit for applying a pulse voltage to the electrode section of the mirror and the fixed electrodes of the first section such that the mirror is rotatably vibrated.

In this case, the voltage applying unit applies the pulse voltage to the electrode section of the mirror and one of the fixed electrodes of the first set such that the mirror starts the vibration from an original position, and stops the application of the pulse voltage when one of the end portions of the mirror reaches the one fixed electrodes.

Also, the voltage applying unit applies the pulse Voltage to the electrode section of the mirror and the one fixed electrode of the first set immediately before the one end portion of the mirror returns to the one fixed electrode and stops the application of the pulse voltage when the one end portion of the mirror returns to the original position.

In addition, the voltage applying unit applies the pulse voltage to the electrode section of the mirror and the one of the fixed electrodes of the first set when the one end portion of the mirror returns to the original position and stops the application of the pulse voltage when the other of the end portions of the mirror reaches the other fixed electrode of the first set.

DESCRIPTION OF THE PREFERRED EMBODIMENT

Next, a light beam scanner of the present invention will be described below in detail with reference to the attached drawings.

Figure 1A:
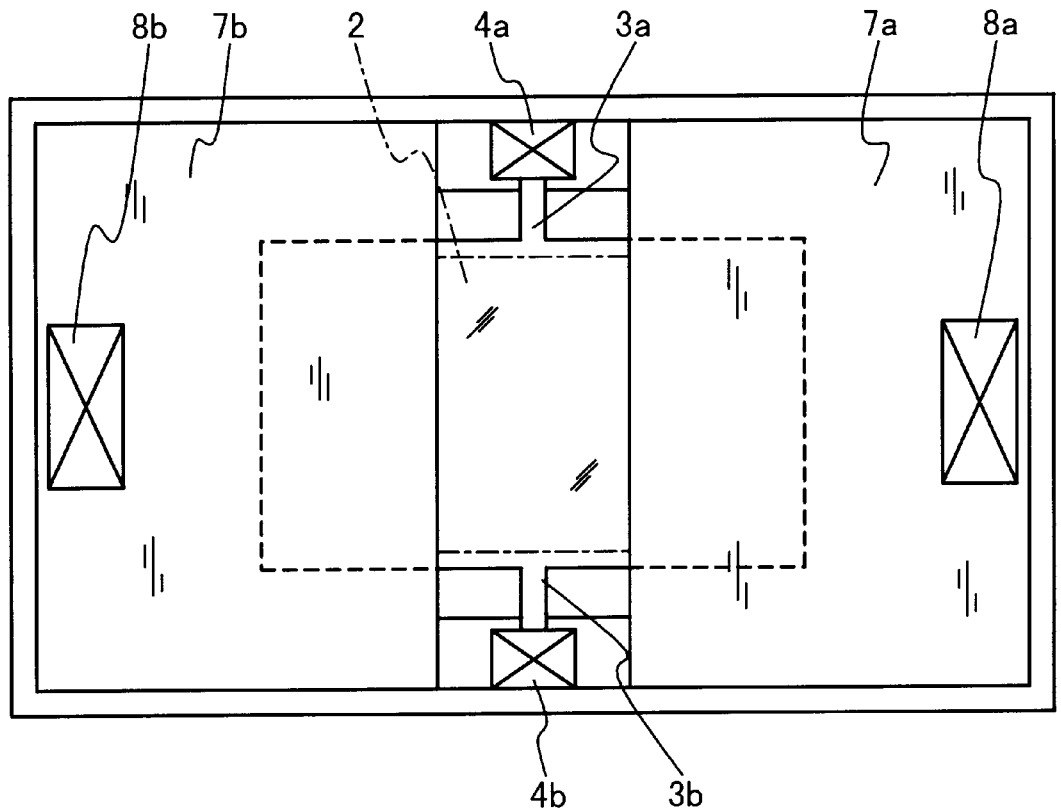
FIGS. 1A and 1B are a plan view and a cross sectional view of a conventional example of a light beam scanner.
Figure 1B:
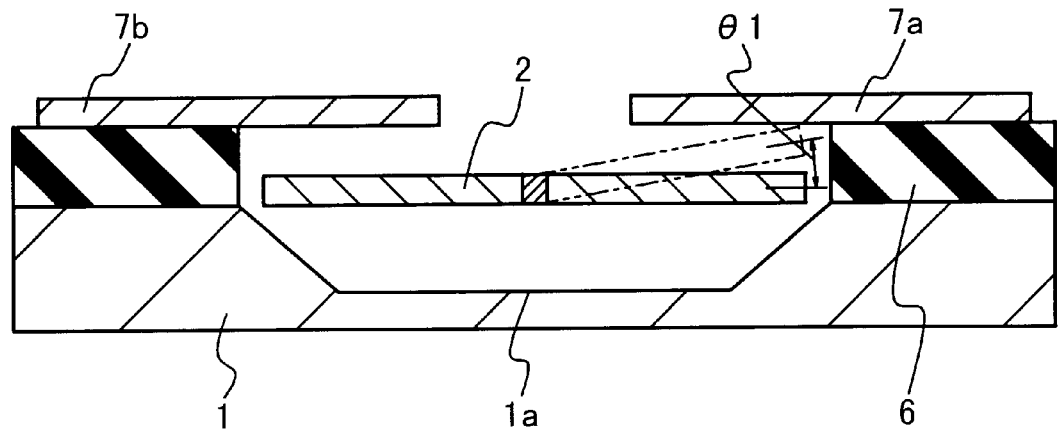
Figure 2A:
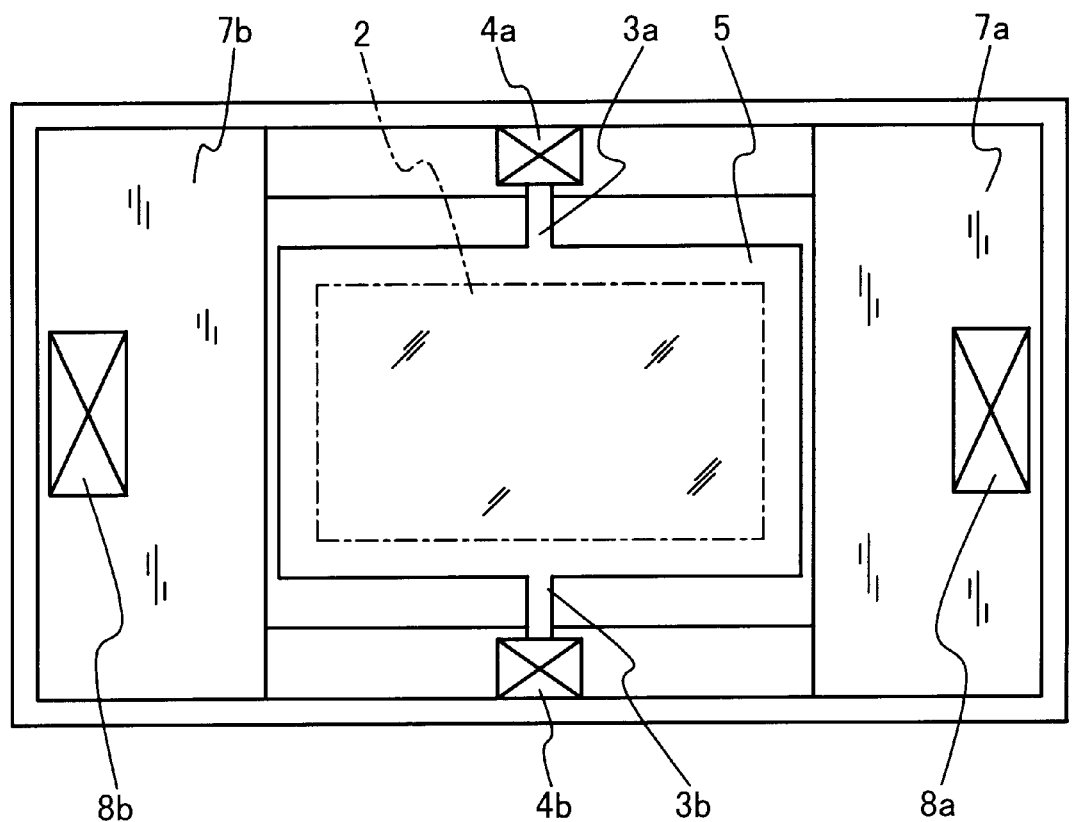
FIGS. 2A and 2B are a plan view and a cross sectional view of the light beam scanner according to the first embodiment of the present invention.

First, the light beam scanner according to the first embodiment of the present Invention will be described below. FIG. 2A is a plan view of the light beam scanner according to the first embodiment of the present invention and FIG. 2B is a cross sectional view of the light beam scanner.

Figure 2B:
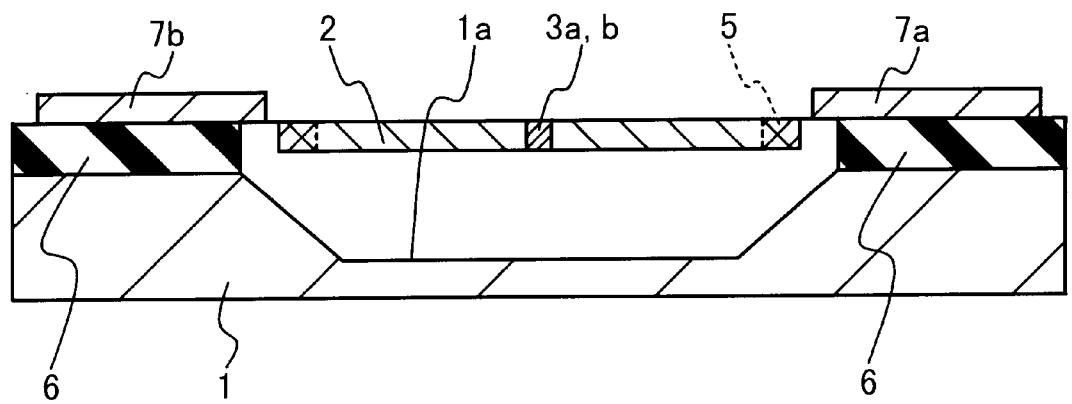

Referring to FIGS. 2A and 2B, the light beam scanner is manufactured using the silicon micromachining technique to have the whole size of several millimeter square. A supporting substrate 1 is formed of a rectangular thick plate and a concave section 1a is formed in the central portion of the supporting substrate 1. The mirror 2 which is formed of a silicon thin film is supported in the concave section 1a. Torsion bars 3a and 3b are formed as a unit together with the mirror 2 to protrude from the both opposing ends of the mirror 2.

The tip portions of these torsion bars 3a and 3b are connected with pads 4a and 4b to be fixed on the supporting substrate 1, respectively. Thus, the mirror 2 can be vibrated in a direction perpendicular to the surface of the mirror 2 by twisting the torsion bars 3a and 3b. Each of the torsion bars 3a and 3b has the length, width and thickness from several μm to several mm. Also, the mirror 2 has the plan size of the several-mm square and the thickness from several μm to hundreds of μm. Impurity ions are implanted or diffused in a peripheral portion of the mirror 2 and a surface thereof at least, and an aluminum film, a silver film or an electrically conductive organic thin film is formed on the surface of the mirror 2. These areas are formed as electrically conductive electrode section 5.

On the other hand, the supporting substrate 1 is provided with fixed electrodes 7a and 7b through an insulating film 6 on the surface of the supporting substrate 1 on both sides of the concave section 1a. These fixed electrodes 7a and 7b are formed of electrically conductive material such as semiconductor or organic material. The side of each of the fixed electrodes 7a and 7b on the concave section 1a is arranged so as to be near to a corresponding one of the both ends of the mirror 2 to form a capacitor by each of the electrode section 5 of the mirror 2 and each of the fixed electrodes 7a and 7b.

In this case, the fixed electrodes 7a and 7b are arranged in such a manner that the fixed electrodes 7a and 7b are higher than the electrode section 5 of the mirror 2. Also, the fixed electrodes 7a and 7b are arranged such that the ends of the fixed electrodes 7a and 7b on the side of the concave section 1a do not overlap the electrode section 5 of the mirror 2 in the plan view. In the other words, the light beam scanner is constructed in such a manner that the electrode sections 5 of the mirror 2 never conflict with the inner end of each of the fixed electrodes 7a and 7b, when the mirror 2 is vibrated by the torsion of the torsion bars 3a and 3b. Also, pads 8a and 8b are formed on the fixed electrodes 7a and 7b, respectively.

Next, a method of driving of the light beam scanner according to the first embodiment of the present invention will be described with reference to FIGS. 3A to 3H.

Figure 3A:
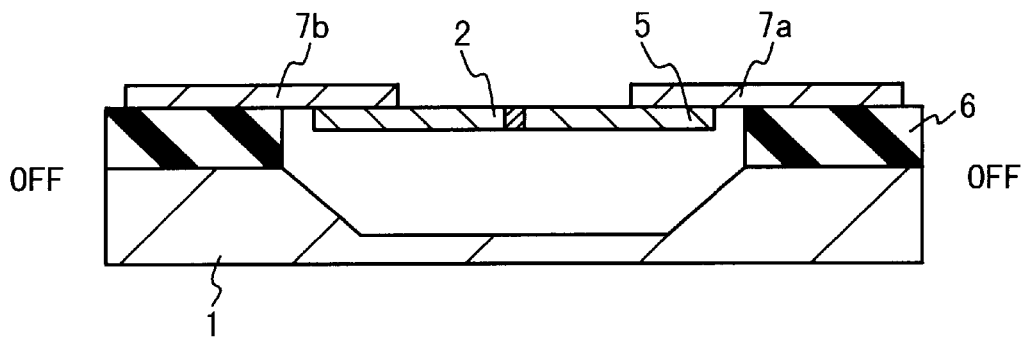
FIGS. 3A to 3H are cross sectional views to describe the operation of the light beam scanner according to the first embodiment of the present invention.
Figure 3B:
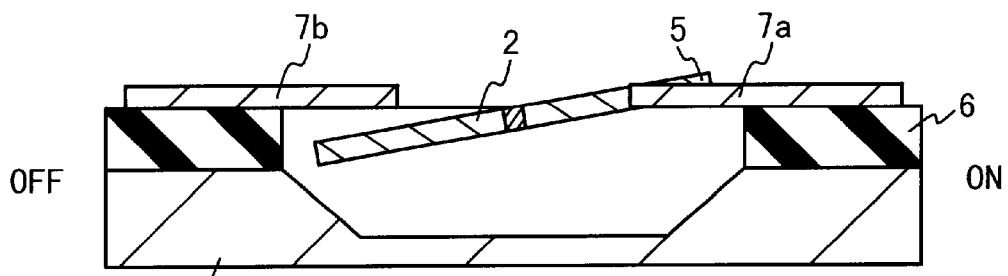
Figure 3C:
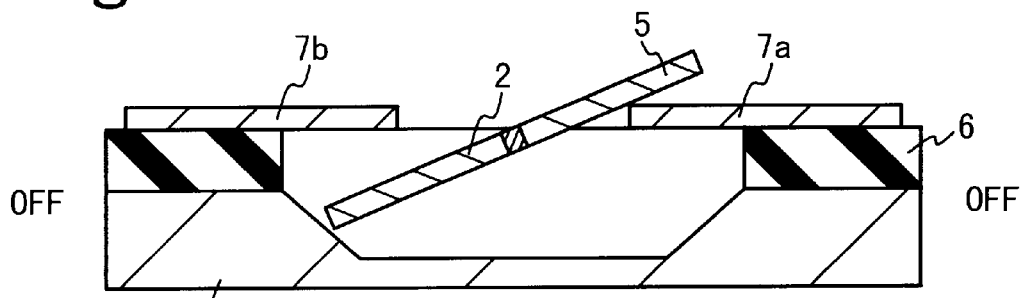
Figure 3D:
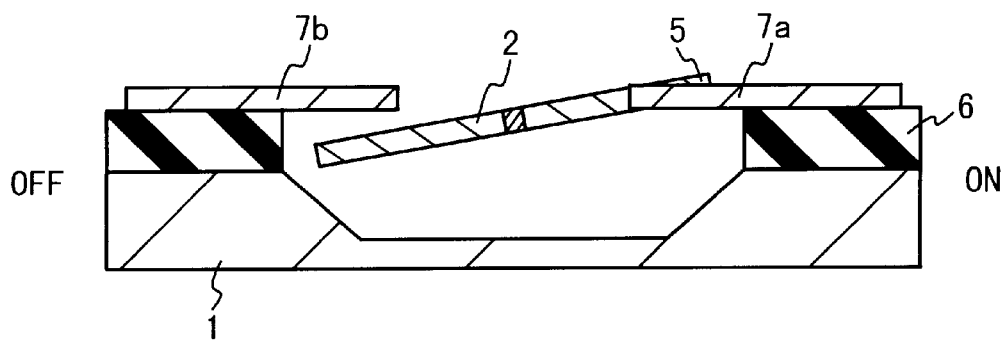

FIG. 2A shows the initial state of the light beam scanner. In this state, a predetermined voltage is applied between the pad 8a of the fixed electrode 7a and the pads 4a and 4b of the torsion bars 3a and 3b. In this case, a voltage is applied on the electrode section 5 of the mirror 2 which is connected to the pad 4a or 4b. As a result, electric charges of the opposite polarities to each other are accumulated to the surface of the fixed electrode 7a and the surface of the electrode section 5 of the mirror 5. As a result, the attractive electrostatic force acts between the fixed electrode 7a and the electrode section 5 of the mirror 2. At this time, because the fixed electrode 7a is arranged in such a manner that the position of the fixed electrode 7a is higher than that of the electrode section 5 of the mirror 2, the mirror 2 starts to rotate in a counterclockwise direction as shown in FIG. 3B. In this case, inertia force is generated to the mirror 2 by this rotating operation. Therefore, even if the application of voltage is stopped when the electrode section 5 of the mirror 2 is being rotated to the position where the distance between the electrode section 5 and the fixed electrode 7a is minimum, the mirror 2 is rotated beyond the position of the fixed electrode 7a. Finally, the mirror 2 is rotated to the maximum rotation position, as shown in FIG. 3C. When the inertia force is decreased and the torsion force of the torsion bars 3a and 3b is also decreased, the mirror 2 starts to rotate in a clockwise direction by the opposite torsion force of the torsion bars 3a and 3b, as shown in FIG. 3D. When a voltage is applied once again between the fixed electrode 7a and the electrode section 5 of the mirror 2 at this time, the above-mentioned rotating operation in the clockwise direction can be accelerated by the attractive electrostatic force between the electrode section 5 of the mirror 2 and the fixed electrode 7a.

Figure 3E:
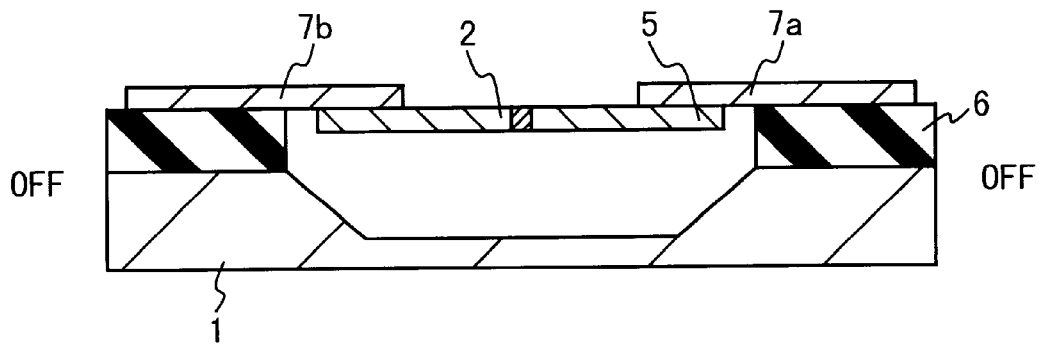
Figure 3F:
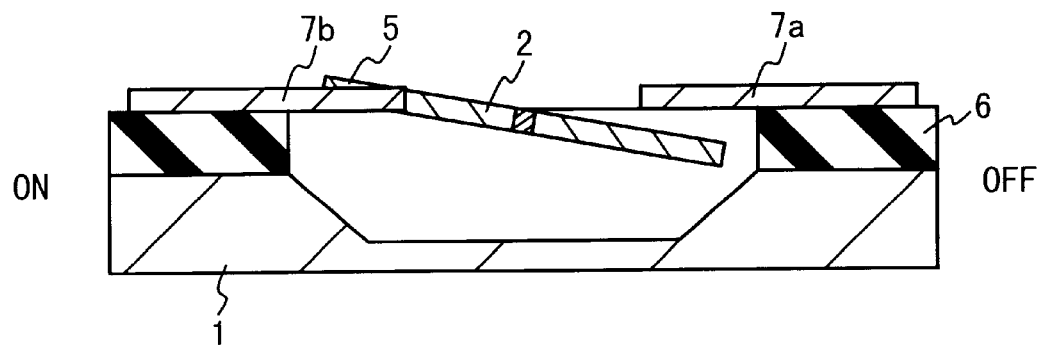
Figure 3G:
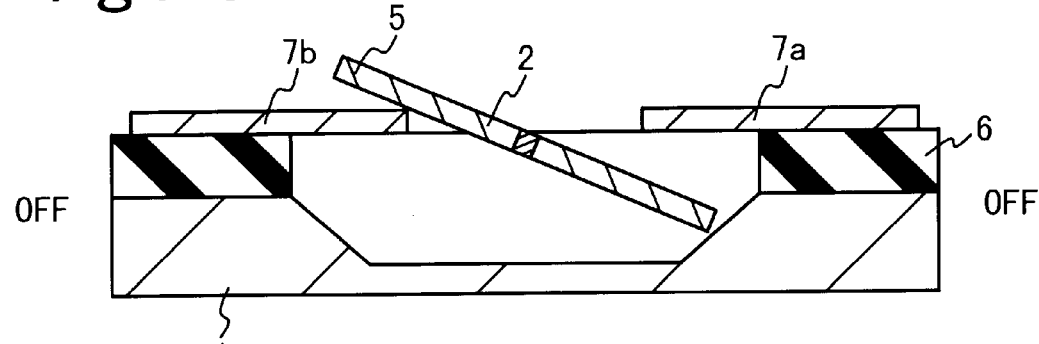
Figure 3H:
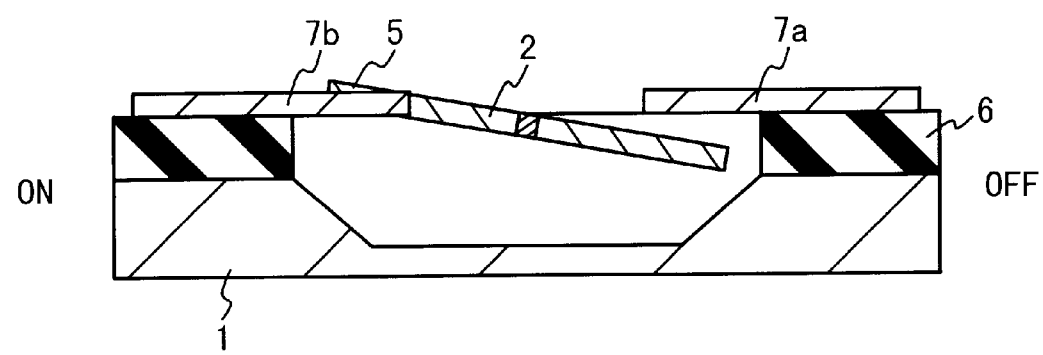

After the mirror 2 is rotated to the original position as shown in FIG. 3E, a voltage is applied between the fixed electrode 7b and the torsion bars, that is, the electrode section 5 of the mirror 2. In this case, as shown in FIGS. 3F to 3H, the mirror 2 is rotated in the same manner as shown in FIGS. 3A to 3D, although the rotation direction is opposite. It should be noted that any voltage is not applied to the fixed electrode 7a during the rotating operation of the mirror 2 in the clockwise direction.

Also, in the state shown in FIG. 3H, if a voltage is applied once again between the fixed electrode 7b and the electrode section 5 of the mirror 2, the rotating operation of the mirror 2 in the counterclockwise direction can be accelerated.

Therefore, By repeating the operation shown in FIGS. 3A to 3H, the mirror 2 is repeatedly rotated to maximum rotation positions in the counterclockwise and clockwise directions. In this manner, the mirror 2 can be vibrated.

Figure 4A:
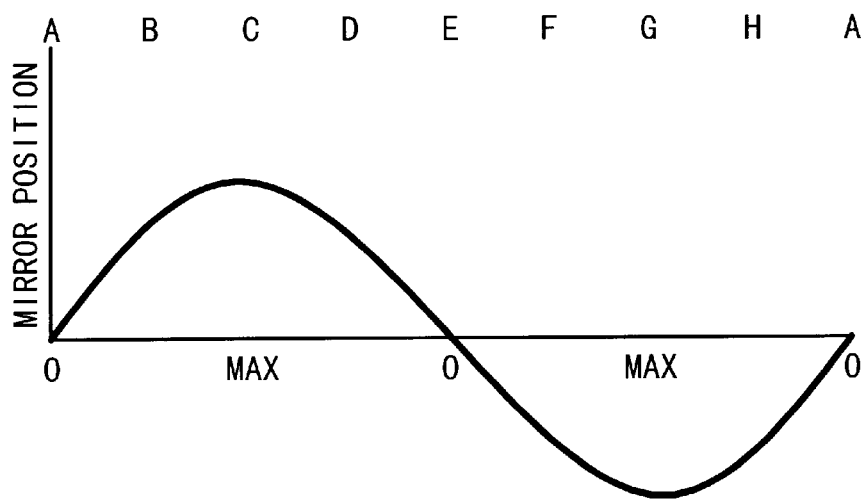
FIG. 4A is a diagram illustrating a relation between the mirror vibration position and the time when the mirror 2 is continuously vibrated.
Figure 4B:
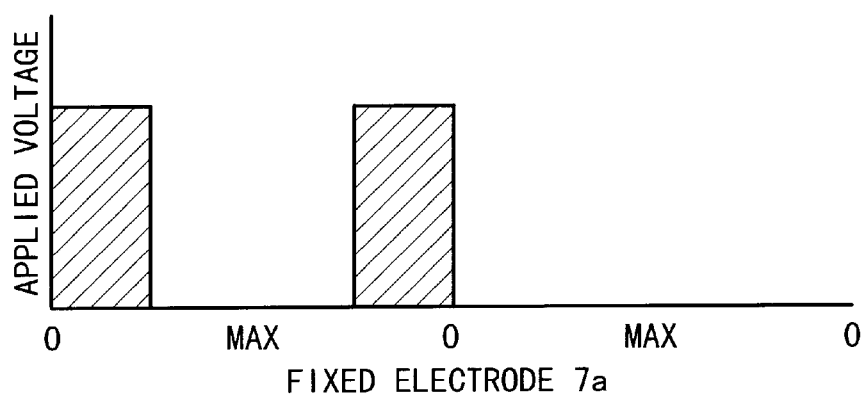
FIGS. 4B and 4C are diagrams illustrating timings of voltage application to the fixed electrodes 7a and 7b, respectively.
Figure 4C:
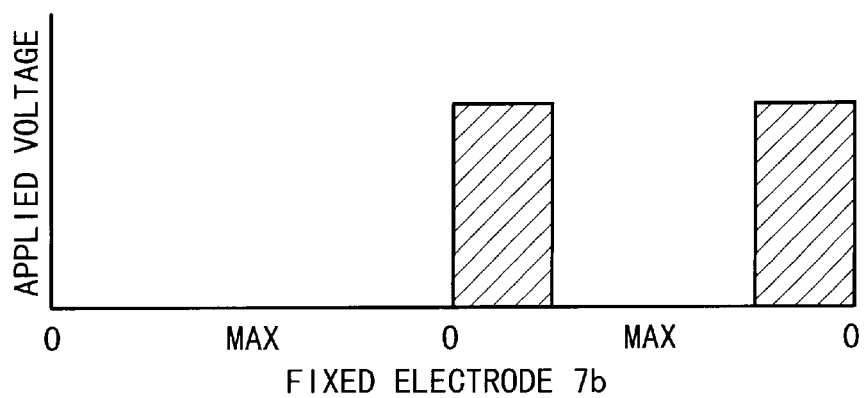

FIG. 4A is a diagram illustrating a relation between the mirror vibration position and the time when the mirror 2 is continuously vibrated. FIGS. 4B and 4C are diagrams illustrating timings of voltage application to the fixed electrodes 7a and 7b, respectively. The characters "A" to "H" correspond to FIGS. 3A to 3H. In this way, the timing of voltage application to the fixed electrodes 7a and 7b is controlled in synchronous with the change of the vibration position of the mirror. Thus, the continuous vibrating operation of the mirror becomes possible as shown in FIGS. 3A to 3H.

In this case, if the voltage continues to be applied between the fixed electrode 7a or 7b and the electrode section 5 of the mirror 2 even after the mirror 2 passes through the closest position to the fixed electrode 7a or 7b, the mirror 2 undergoes influence of the attractive electrostatic force. As a result, the mirror 2 cannot reach the maximum vibration angle. For this reason, a drive pulse voltage is applied in such a manner that the voltage application is stopped immediately after the electrode section 5 of the mirror 2 passes the fixed electrode 7a or 7b. Thus, the mirror 2 can be vibrated in a resonance state synchronous with the drive pulse voltage.

Figure 5:
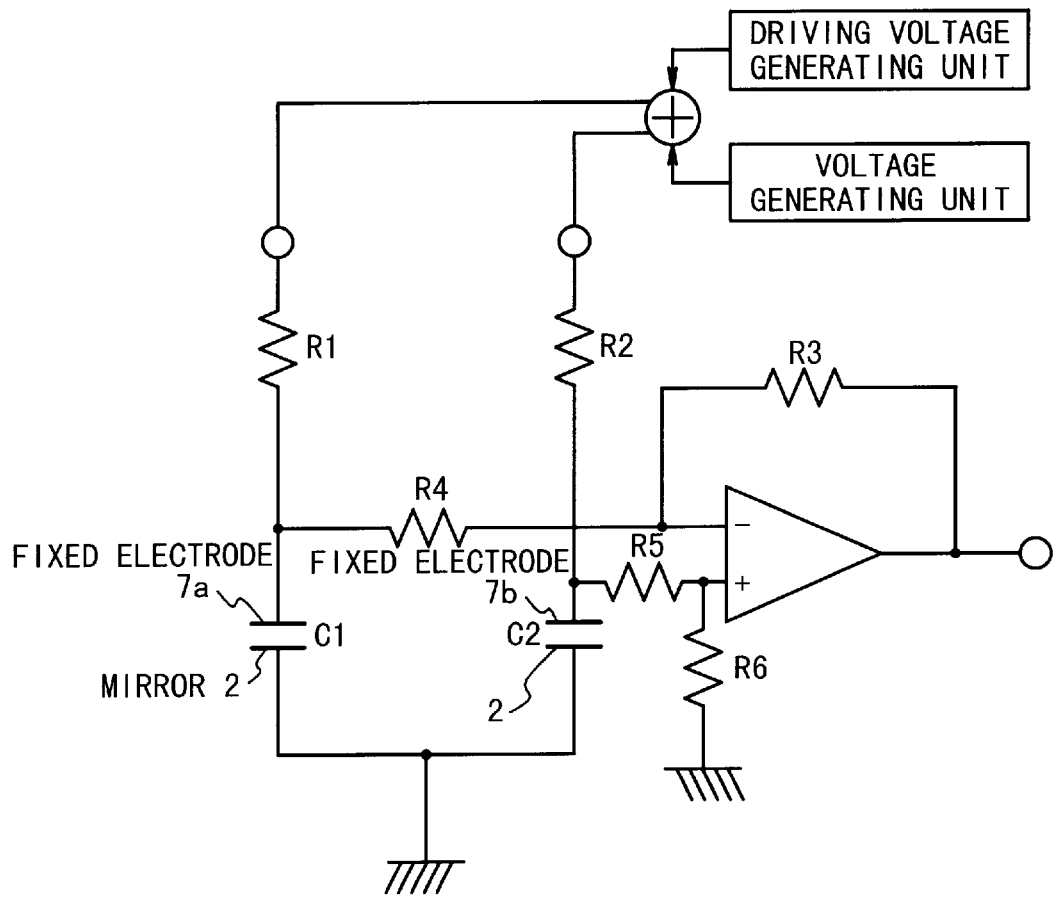
FIG. 5 is a circuit diagram illustrating the structure of a circuit for measuring the vibration position of the mirror.

In order to synchronize the application of the drive pulse voltage with the vibration of the mirror 2, it is necessary to measure the vibration position of the mirror. FIG. 5 is a circuit diagram illustrating the structure of a circuit for measuring the vibration position of the mirror. Because a capacitor structure is formed by the electrode section 5 of the mirror 2 and each of the fixed electrodes 7a and 7b. Therefore, such capacitors are shown as capacitors C1 and C2 in the equivalent circuit of FIG. 5. Using resistors R1 to R6, the difference between currents flowing the capacitors C1 and C2 is determined by a differential operational amplifier OP. As described above, since the mirror 2 is vibrated symmetrically on either side, the position of the mirror can be measured from the difference between the current quantities flowing through the capacitors C1 and C2, when an AC voltage having a small amplitude and a higher frequency is superimposed on the drive pulse voltage.

Figure 6:
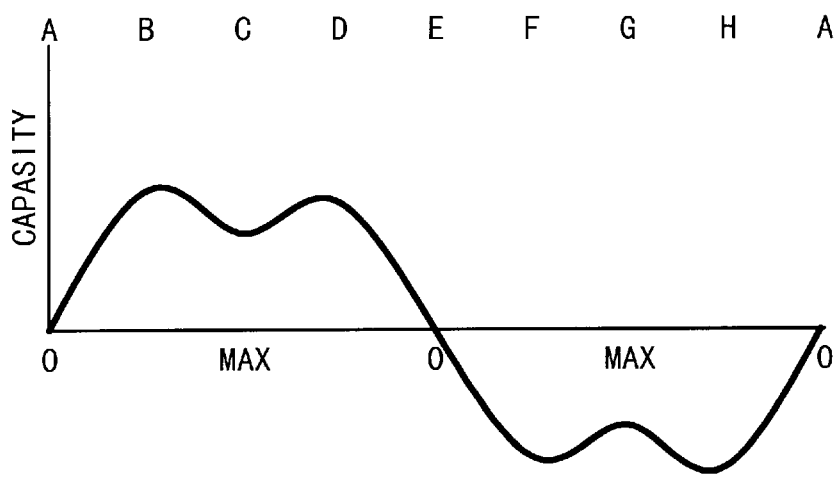
FIG. 6 is shows change of capacity value of each of the capacitors C1 and C2 with the vibrating operation of the mirror.

FIG. 6 is shows change of capacity value of each of the capacitors C1 and C2 with the vibrating operation of the mirror 2. The characters "A" to "H" correspond to FIGS. 3A to 3H. As seen from the FIG. 6, the vibrating operation of the mirror 2 and the capacity value have a predetermined relation. Therefore, when the position of the mirror 2 can be determined if the capacity value is measured. Thus, the signal indicative of the position of the mirror can be used as a signal for synchronizing with another signal.

Also, because the capacity value is proportional to the maximum value of the vibration angle, the maximum vibration angle of the mirror can be controlled by controlling the capacity value.

Also, when the mirror is driven in a single resonance mode, a proportional relation is derived between the vibration speed of the mirror and the maximum vibration angle thereof, if the frequency of the drive pulse voltage is known. Therefore, when a time-dependent change of the capacity value is calculated from a differentiated value of the current quantity flowing through each of the fixed electrodes, the maximum vibration angle of the mirror can be measured. The maximum vibration angle can be controlled using a signal indicative of the time-dependent change of the capacity value.

In this way, in the light beam scanner in the first embodiment, the side portion of each of the fixed electrodes 7a and 7b and the electrode section 5 of the mirror 2 are arranged on the position where they do not overlap to each other. Therefore, even if the mirror 2 is vibrated, the electrode section of the mirror 2 never conflicts with the fixed electrodes 7a and 7b. As a result, the maximum vibration angle of the mirror 2 can be made large. Also, from the above reason, it is possible to reduce the gap distance between the mirror 2 and the fixed electrodes 7a and 7b to a manufacturing limitation of the semiconductor fine processing which is micrometer order. Therefore, when the mirror 2 is vibrated using the attractive electrostatic force as the driving force, the driving force is proportional to the square of the gap distance in case of the same voltage. Therefore, the large driving force can be obtained with the smaller voltage as the gap distance is made smaller. In the first embodiment, the vibrating operation of the mirror can be accomplished with an extremely low voltage.

Figure 7A:
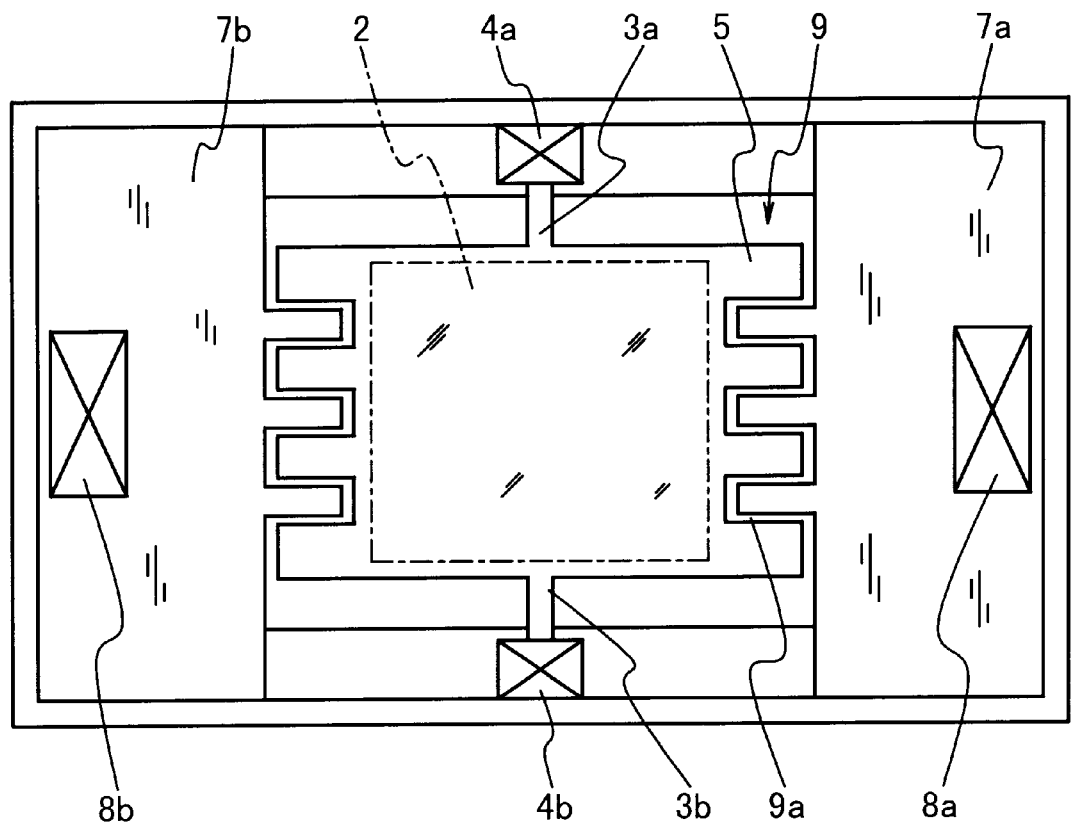
FIGS. 7A and 7B are a plan view and a cross sectional view of the light beam scanner according to the second embodiment of the present invention.
Figure 7B:
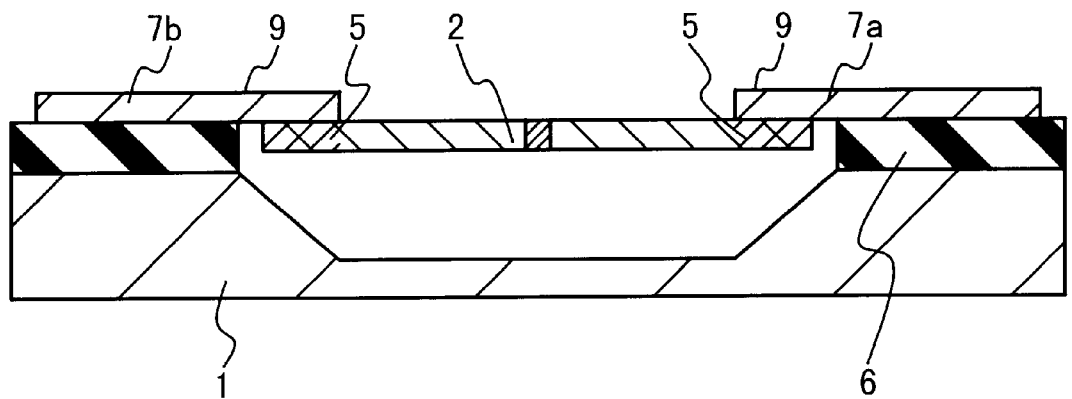

FIGS. 7A and 7B are a plan view and a cross sectional view of the light beam scanner according to the second embodiment of the present invention, respectively. In the second embodiment, the opposing end portion of the electrode sections 5 of the mirror 2 and that of each of the fixed electrodes 7a and 7b are formed in a comb shape 9, so that the opposing area of the electrode section 5 of the mirror 2, and the fixed electrodes 7a and 7b is increased. The opposing end portion of the electrode sections 5 of the mirror 2 and that of each of the fixed electrodes 7a and 7b are arranged not to overlap each other. For this reason, the opposing end portion of the electrode sections 5 of the mirror 2 opposes to that of each of the fixed electrodes 7a and 7b in the concave and convex portions 9a so as to increase the opposing area. Therefore, in the second embodiment, the light beam scanner can have the opposing area 3 times or more larger than that of the first embodiment. As a result, when the distance between the opposing end portion of the electrode sections 5 of the mirror 2 opposes to that of each of the fixed electrodes 7a and 7b is equal to that of the first embodiment, it is possible to generate attractive electrostatic force 3 times or more larger than that generated in the first embodiment when the same voltage is applied. It should be noted that further large driving force of the mirror 2 can be obtained if the distance between the concave and convex portions 9a is made narrower and the number of the concave and convex portions 9a is increased.

Figure 8A:
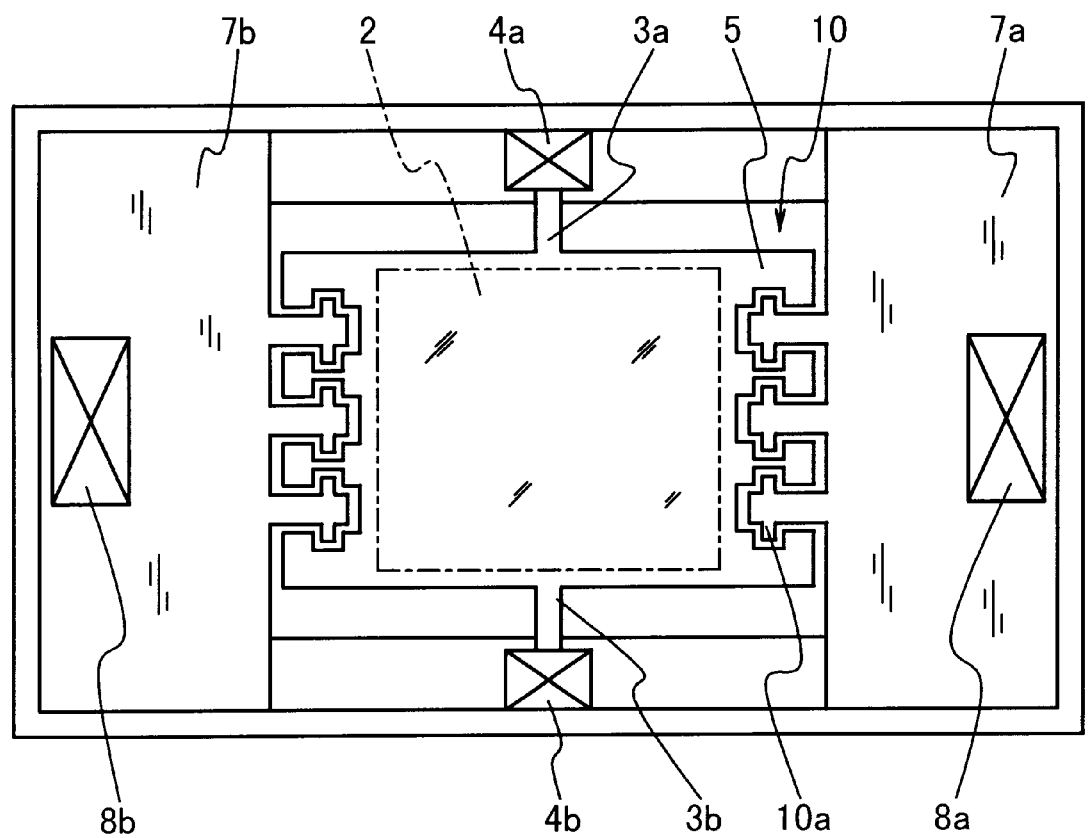
FIGS. 8A and 8B are a plan view and a cross sectional view of the light beam scanner according to the third embodiment of the present invention.
Figure 8B:
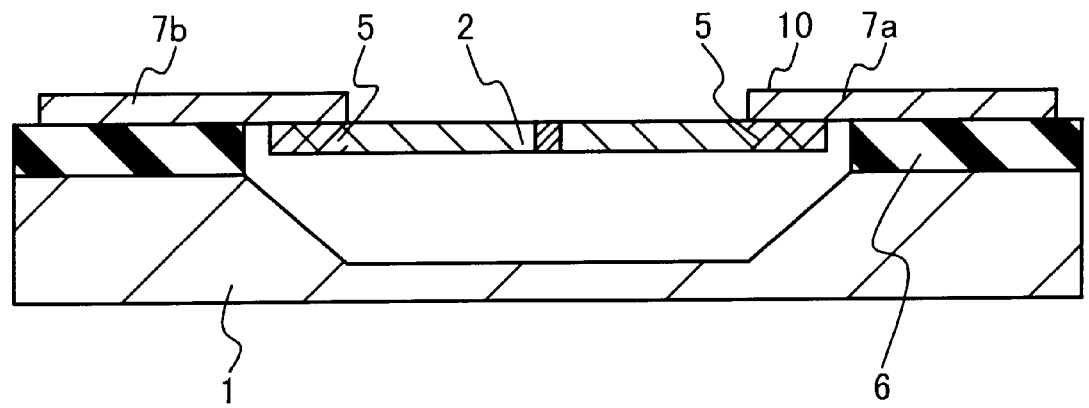

FIGS. 8A and 8B are a plan view and a cross sectional view of the light beam scanner according to the third embodiment of the present invention, respectively. In the third embodiment, an additional convex and concave portions 10a are further formed in the convex and concave portions 9a such that the additional convex and concave portions 10a extends in a direction perpendicular to the convex and concave portions 9a in a plan view. In this structure, the opposing area between the electrode section 5 of the mirror and each of the fixed electrodes 7a and 7b can be further increased. As a result, the opposing area between the electrode section 5 of the mirror 2 and the each of the fixed electrodes 7a and 7b can be increased 4 times or more, compared with that of the first embodiment shown in FIGS. 2A and 2B.

Thus, it is possible to generate the attractive electrostatic force 4 times or more larger than in the structure of the first embodiment, if the distance between the electrode section 5 of the mirror 2 and the each of the fixed electrodes 7a and 7b is the same as in the first embodiment and the voltage having the same amplitude as in the first embodiment is applied.

It should be noted that it is possible to increase the opposing area further more such that the larger driving force can be accomplished, if the additional convex and concave portions 10a are provided to the convex and concave portions 9a.

Figure 9A:
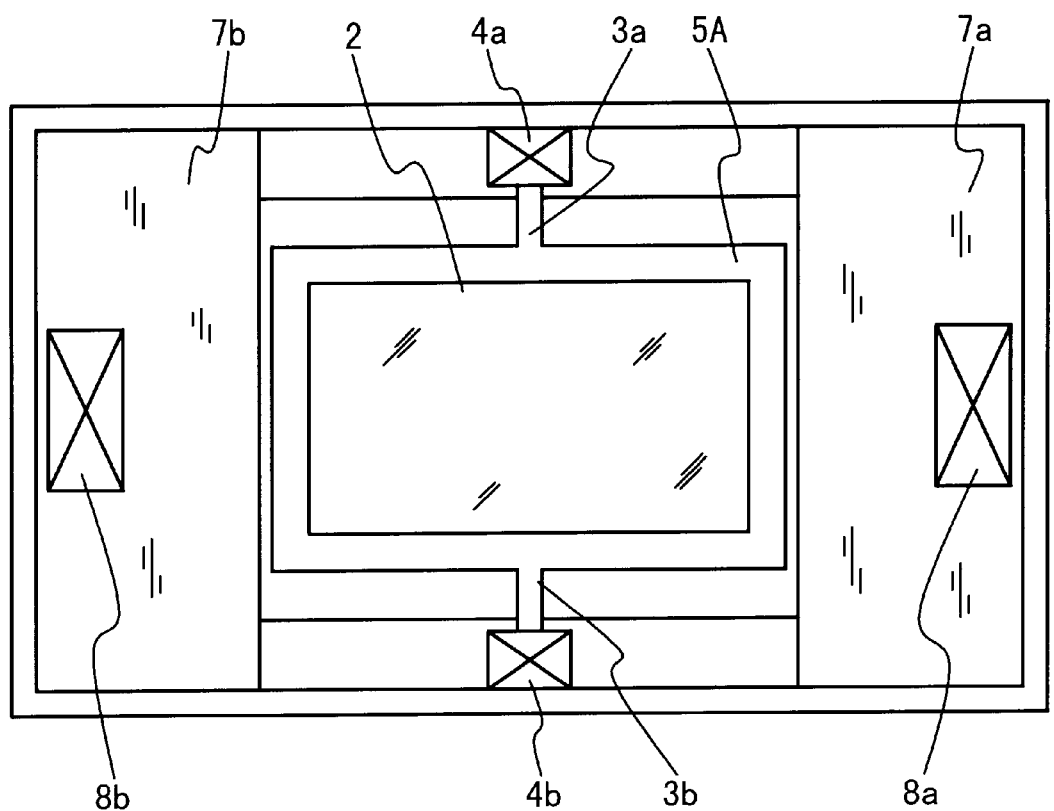
FIGS. 9A and 9B are a plan view and a cross sectional view of the light beam scanner according to the fourth embodiment of the present invention.
Figure 9B:
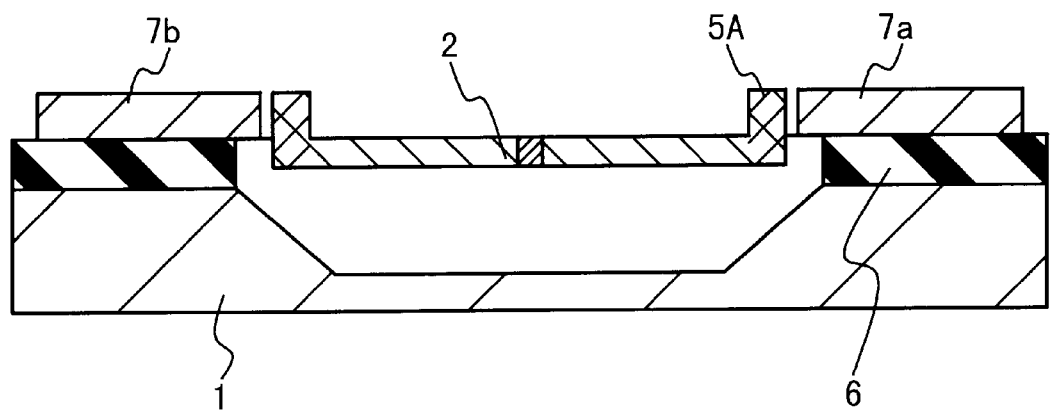

FIGS. 9A and 9B are a plan view and a cross sectional view of the light beam scanner according to the fourth embodiment of the present invention, respectively.

In the fourth embodiment, the electrode section 5 of the mirror 2 is increased in thickness compared to that of a main body of the mirror 2. Thus, the opposing area between each of the fixed electrodes 7a and 7b and the electrode section 5 of the mirror 2 is increased. The mirror 2 is desirably light since the mirror 2 is vibrated at high speed. For this purpose, in the fourth embodiment, only the height of electrode section 5 of the mirror 2 is increased. Also, the thickness of each of the fixed electrodes 7a and 7b which are arranged to oppose to the electrode section 5 of the mirror 2. In this way, if the opposing area between the electrode section 5 of the mirror 2 and each of the fixed electrodes 7a and 7b is increased by increase of the direction of them, the large driving force can be accomplished like the second and third embodiments.

Also, in the fourth embodiment, since the time during which said electrode section 5 of the mirror 2 opposes to each of the fixed electrodes 7a and 7b while the mirror 2 is vibrated is increased, further larger at tractive electrostatic force can be generated.

Figure 10A:
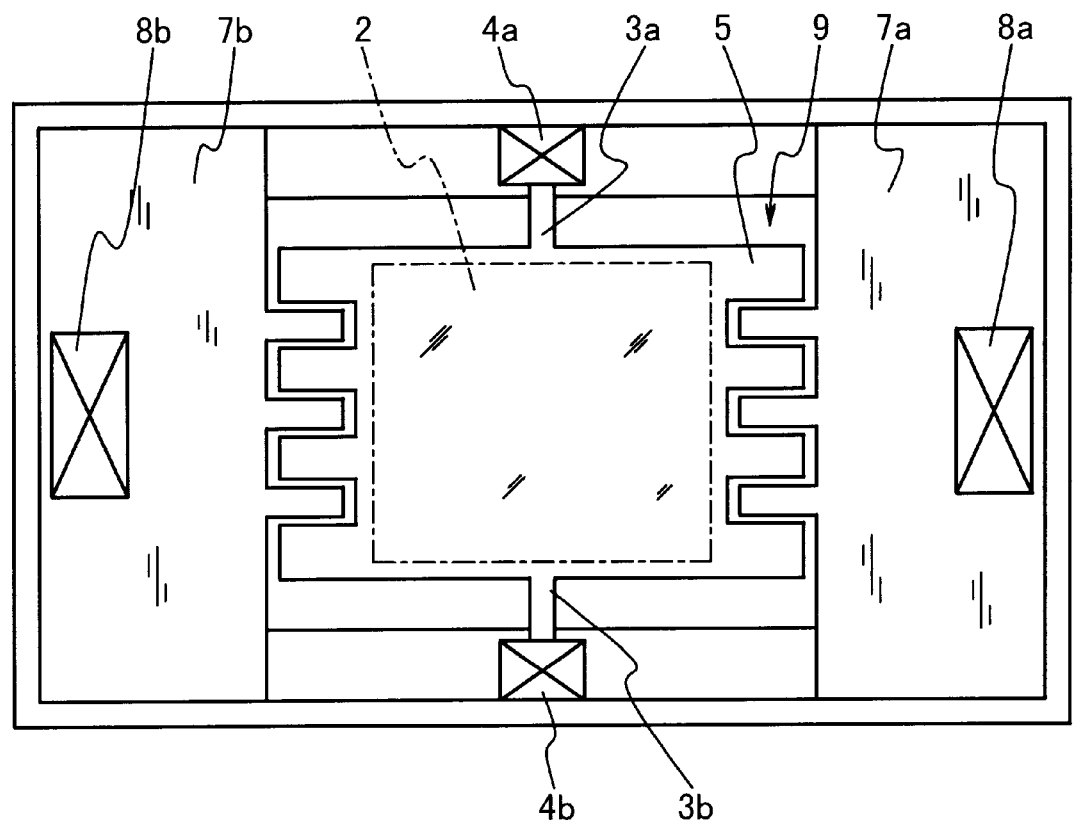
FIGS. 10A and 10B are a plan view and a cross sectional view of the light beam scanner according to the fifth embodiment of the present invention.
Figure 10B:
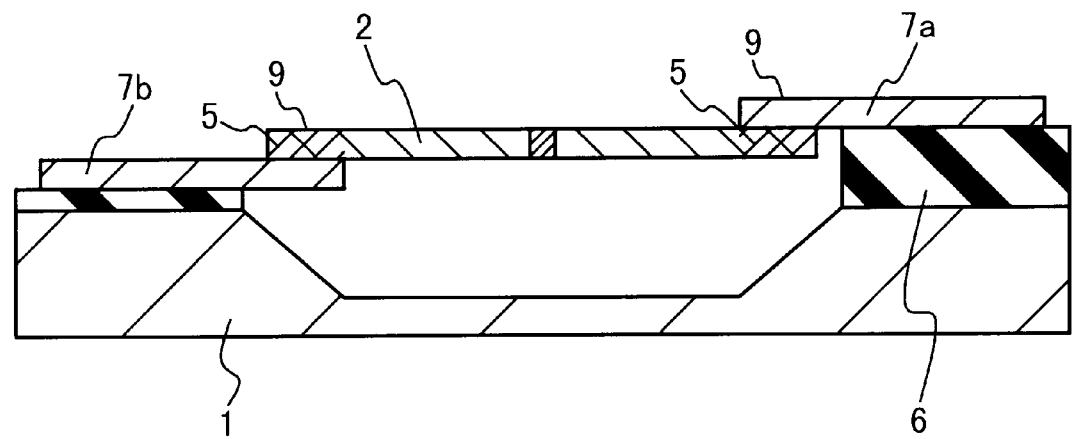

FIGS. 10A and 10B are a plan view and a cross sectional view of the light beams scanner according to the fifth embodiment of the present invention, respectively. In the fifth embodiment, the plane shape of the electrode section 5 of the mirror 2 and the plane shapes of the fixed electrodes 7a and 7b are the same as in the second embodiment. However, the position of the fixed electrodes 7a and 7b in the height direction is different from those of the second embodiment. That is, the fixed electrode 7a is arranged in the higher position with respect to an original position of the mirror 2, i.e., in case of no application of a voltage, considering the torsion bars 3a and 3b as a symmetrical center. On the other hand, the fixed electrode 7b is arranged in a lower position with respect to the original position of the mirror 2. In this structure, when the voltage is applied to both of the fixed electrodes 7a and 7b at a time, the attractive electrostatic force in the same direction is generated between the fixed electrode 7a and the electrode section 5 of the mirror 2 and between the fixed electrode 7b and the electrode section 5. Therefore, the driving force can be more obtained based on twice of attractive electrostatic force generated in the second embodiment.

Also, because the driving force is generated symmetrically to mirror 2, there is an effect in which the transformation of the mirror can be prevented.

Figure 11A:
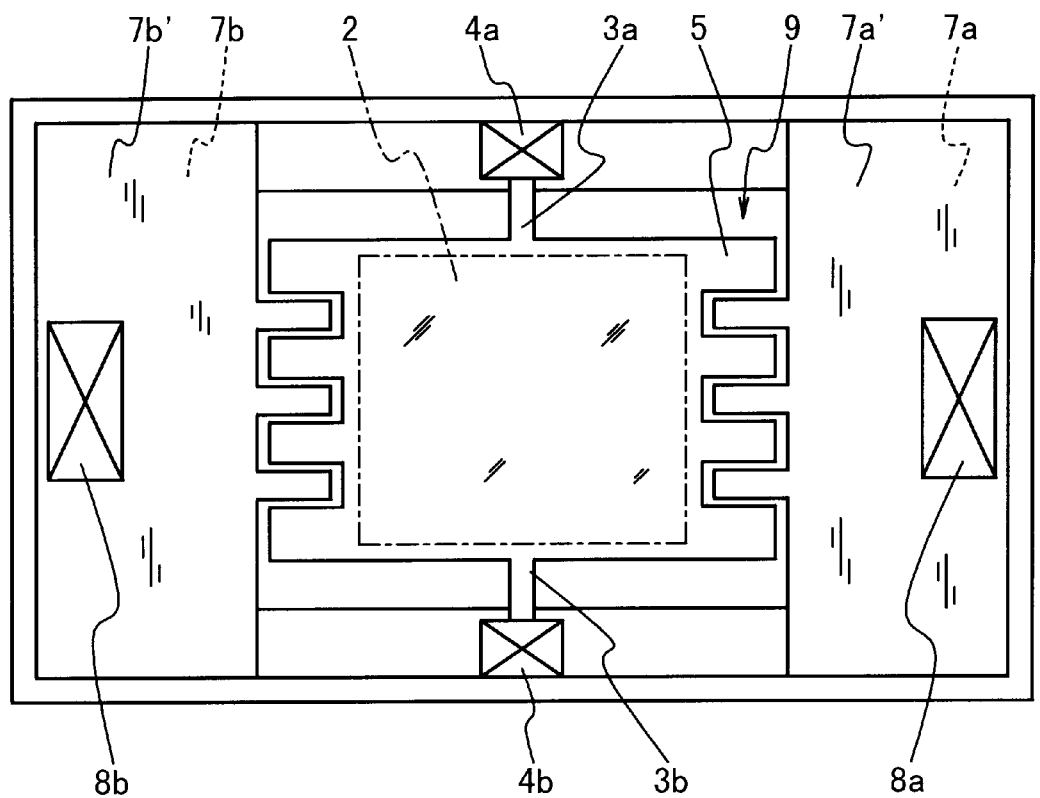
FIGS. 11A and 11B are a plan view and a cross sectional view of the light beam scanner according to the sixth embodiment of the present invention.
Figure 11B:
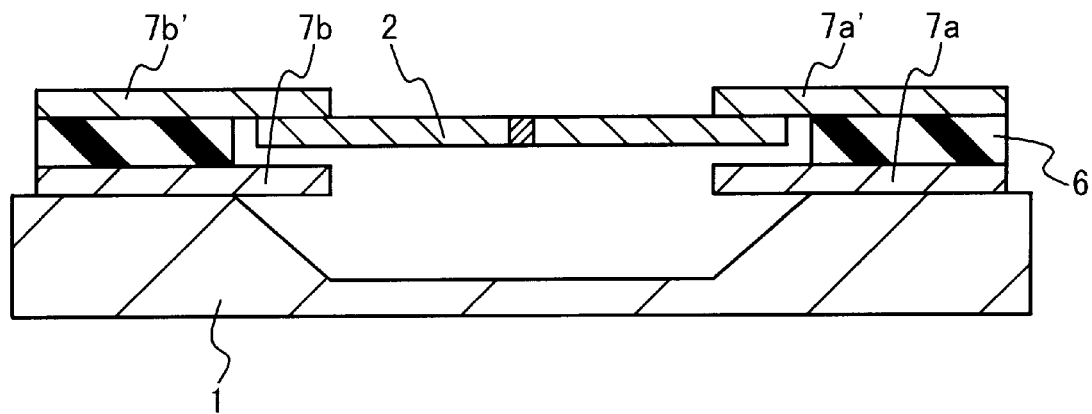

FIGS. 11A and 11B are a plan view and a cross sectional view of the light beam scanner according to the sixth embodiment of the present invention, respectively. In the sixth embodiment, the structure of the fifth embodiment is extended.

That is, the set of fixed electrode 7a and 7b are formed on the supporting substrate 1 and a new set of fixed electrodes 7a' and 7b' are formed on the fixed electrodes 7a and 7b via an insulating film 6. In this manner, the sets of fixed electrodes 7a and 7b, and 7a' and 7b' are arranged in the positions where the electrode section 5 of the mirror 2 is put in the sets of fixed electrodes 7a and 7b, and 7a' and 7b' in the height direction. When a voltage is applied at the same time to the fixed electrodes 7a and 7b' or 7a' and 7b which are in the symmetry positions with respect to the torsion bars 3a and 3b. In this case, in the fifth embodiment, twice of attractive electrostatic force can be generated, compared with that of the fifth embodiment. If the applied voltage is symmetrically switched based on the vibration direction of the mirror 2, it is possible to generate large attractive electrostatic force in the clockwise and counterclockwise directions of the vibration of the mirror 2. Therefore, the driving force can be efficiently generated.

Figure 12A:
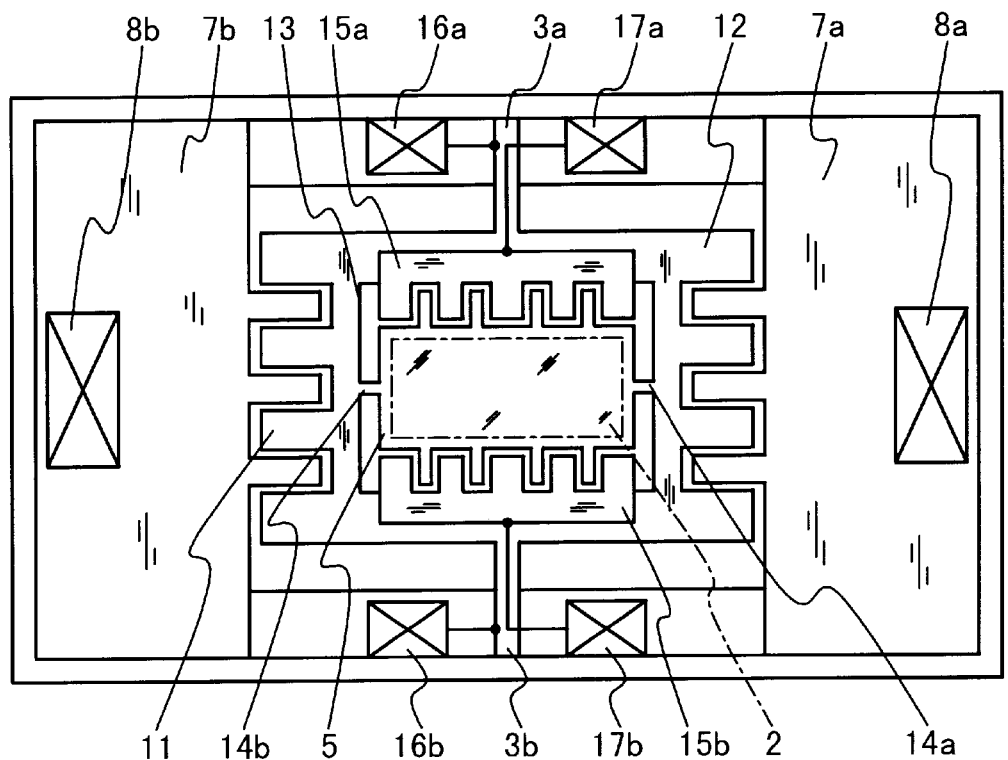
FIGS. 12A and 12B are a plan view and a cross sectional view of the light beam scanner according to the seventh embodiment of the present invention.
Figure 12B:
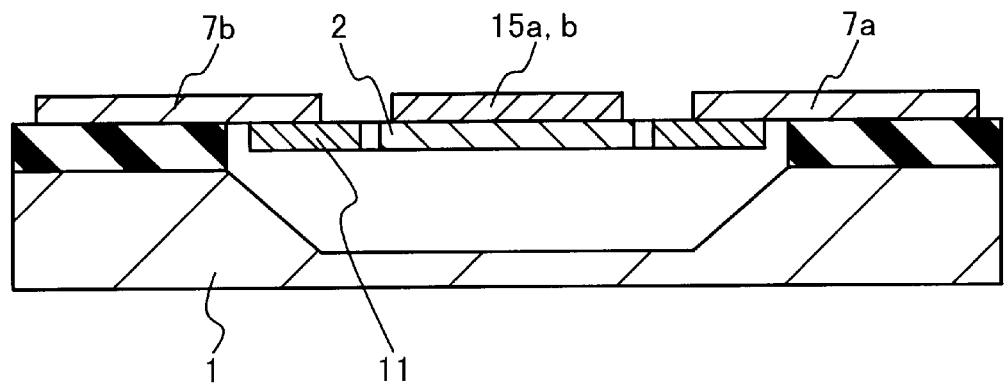

FIGS. 12A and 12B are a plan view and a cross sectional view of the light beam scanner according to the seventh embodiment of the present invention, respectively. In the seventh embodiment, a mirror can be realized to be vibratable with respect to two rotation axes which are orthogonal to each other. Thus, the light beam scanner is possible to scan a light beam to the X direction and the Y direction. For this purpose, an intermediate supporting substrate 11 is provided to have a vibration freedom with respect to the Y axis and the mirror 2 is provided in the intermediate supporting substrate 11 to have the vibration freedom of the X axis. That is, the intermediate supporting substrate 11 is supported to the supporting substrate 1 by two torsion bars 3a and 3b to be vibratable with respect to the Y axis. Also, the intermediate supporting substrate 11 has electrode sections 12 in both end portions into the X direction. The fixed electrodes 7a and 7b are provided with a small gap on the supporting substrate 1 in both sides of the intermediate supporting substrate 11 to vibrate the intermediate supporting substrate 11. It should be noted that the opposing ends of the electrode sections 12 and the fixed electrodes 7a and 7b are formed to have a comb shape, as in the second embodiment to increase the opposing area. Also, pads 8a and 8b are provided for the fixed electrodes 7a and 7b.

On the other hand, an opening 13 is provided inside of the intermediate supporting substrate 11, and the mirror 2 is arranged in the opening 13. The mirror 2 is supported to the intermediate supporting substrate 11 by two torsion bars 14a and 14b such that the mirror 2 can be rotatably vibrated with respect to the X axis. The mirror 2 has electrode section 5 formed in the Y axial direction. Fixed electrodes 7a and 7b are provided on the intermediate supporting substrate 11 on both sides of the mirror 2, that is, in the positions on both sides of the mirror 2 in a direction orthogonal to the direction of the fixed electrodes 7a and 7b. In this case, end portions of the electrode sections 5 of the mirror 2 and that of each of the fixed electrodes 15a and 15b are formed to have a comb shape so as to increase the opposing area. It should be noted that the electrode sections 5 and 12 are connected to pads 16a and 16b, and the fixed electrode 15a and 15b are insulated from the electrode sections 5 and 12 and the pads 16a and 16b, and are connected to pads 17a and 17b.

Therefore, in the seventh embodiment, when a voltage is applied to the fixed electrodes 7a and 7, the intermediate supporting substrate 11 can be rotatably vibrated around the Y axis with respect to the supporting substrate 1. Also, the mirror 2 can be rotatably vibrated around the Y axis together with this intermediate supporting substrate 11. Also, when a voltage is applied to the fixed electrodes 15a and 15b, the mirror 2 can be rotatably vibrated around the X with respect to the intermediate supporting substrate 11. As a result, By application of the controlled voltage to the fixed electrodes 7a and 7b, and 15a and 15b, the mirror 2 can be rotatably vibrated around the Y axis and the X axis. In this manner, the light beam scanner which can scan a light beam to the X direction and the Y direction can be realized. It should be noted that the vibrating operation of the intermediate supporting substrate 11 with respect to the supporting substrate 1 and the vibrating operation of the mirror 2 with respect to the intermediate supporting substrate 11 are performed based on the operation principle described in the above embodiments.

In the above embodiments, in order to realize the voltage application to the mirror 2, the torsion bars are formed of conductive material. Alternatively, wiring is provided for the surface of the torsion bar. However, it is possible that the mirror and the pads are electrically connected by use of a soft transformable wiring as in a general voice coil-type speaker.

In a case where the light beam scanner of the present invention is applied to, for example, a laser printer, when the distance between the mirror and the fixed electrode is set to be 1 μm, the amplitude of mirror vibration of equal to or more than 30 degrees can be accomplished at the 1-kHz scan rate, if the voltage of 5 V is applied between the fixed electrode and the mirror. Otherwise, when the mirror is scanned at 15.74 kHz for a head mount display, the mirror scan angle of ±2 degrees which is needed for a still display of 2000×2000 pixels can be realized using the voltage of about 5 V.

As described above, according to the present invention, the mirror and the fixed electrodes are formed not to overlap in a plan view in the direction of the vibration of the mirror. Thus, even if the distance between the fixed electrode and the electrode sections 5 of the mirror is made small, any collision between the fixed electrode and the mirror never occurs. Therefore, a large electrostatic force is obtained when the application voltage is low voltage, and the light scan with a large deflection angle can be realized. Also, the whole light beam scanner which includes the driving circuit can be made small and it is effective for the reduction of manufacturing cost.

In addition, the intermediate supporting substrate is rotatably and vibratably supported to the supporting substrate. Also, the mirror is rotatably and vibratably supported to the intermediate supporting substrate. Thus, the light beam scanner in which the light scan to the and directions is possible can be realized.

Also, in the present invention, a pulse voltage is applied in synchronous with the vibrating operation of the vibration section such as the mirror and the intermediate supporting substrate. Therefore, the vibration section can be smoothly vibrated with less power without use of any complicated structure. Also, the resonance condition of the vibration section can be detected and moreover the ideal vibration control can be realized.

What is claimed is:

1. A light beam scanner comprising:

a supporting substrate;

fixed electrodes of a first set provided on said supporting substrate to oppose to each other;

a mirror provided between said fixed electrodes, having torsion bars physically connected to said supporting substrate and a mirror electrode section in end portions of said mirror opposing to said fixed electrodes at least, wherein said mirror rotatably vibrates between an upper position of said one fixed electrode and a lower position thereof by torsion force of said torsion bars and electrostatic force due to a voltage using said torsion bars as a rotation axis, when said voltage is applied between one of said fixed electrodes and said electrode section.

2. A light beam scanner according to claim 1, wherein said mirror and said fixed electrodes of said first set are arranged in a plan view such that said mirror and said fixed electrodes do not overlap.

3. A light beam scanner according to claim 2, wherein a shape of each of said end portions of said mirror and a shape of the opposing one of said fixed electrodes of said first set are determined such that a capacity between said end portion and said opposing fixed electrode can be made larger.

4. A light beam scanner according to claim 3, wherein each of said end portions of said mirror and each of said fixed electrodes of said first set have comb shapes.

5. A light beam scanner according to claim 1, wherein said fixed electrodes of said first set are provided to have lower surfaces higher than an upper surface of said mirror when no voltage is applied between said electrode section of said mirror and said fixed electrodes of said first set.

6. A light beam scanner according to claim 5, wherein said end portions of mirror extend upward.

7. A light beam scanner according to claim 5, further comprising fixed electrodes of a second set provided to said supporting substrate to have upper surfaces lower than a lower surface of said mirror when no voltage is applied between said electrode section of said mirror and said fixed electrodes of said second set.

8. A light beam scanner according to claim 7, wherein said voltage is applied between said electrode section of said mirror and one of said fixed electrodes of said first set and one of said fixed electrodes of said second set opposing to said one fixed electrode of said first set.

9. A light beam scanner according to claim 1, wherein one of said fixed electrodes of said first set is provided to have a lower surface higher than an upper surface of said mirror, when no voltage is applied between said electrode section of said mirror and said fixed electrodes of said first set.

10. A light beam scanner according to claim 1, wherein one of said fixed electrodes of said first set is provided to have an upper surface lower than a lower surface of said mirror, when no voltage is applied between said electrode section of said mirror and said fixed electrodes of said first set.

11. A light beam scanner according to claim 1, further comprising:

another supporting substrate having fixed electrodes of a third set provided on said other supporting substrate to oppose to each other, and wherein said supporting substrate is provided between said fixed electrodes of said third set, and further comprises:

a substrate electrode section in end portions of said supporting substrate opposing to said fixed electrodes of said third set at least; and second torsion bars extending in a direction perpendicular to said torsion bars, and wherein said supporting substrate rotatably vibrates between upper and lower positions of said fixed electrodes of said third set by torsion force of said second torsion bars and electrostatic force due to a voltage applied between said substrate electrode section and said fixed electrodes of said third set.

12. A light beam scanner according to claim 11, wherein said supporting substrate and said fixed electrodes of said third set are arranged in a plan view such that said supporting substrate and said fixed electrodes of said third set do not overlap.

13. A light beam scanner according to claim 1, further comprising a voltage applying unit for applying a pulse voltage to said electrode section of said mirror and said fixed electrodes of said first section such that said mirror is rotatably vibrated.

14. A light beams scanner according to claim 13, wherein said voltage applying unit applies said pulse voltage to said electrode section of said mirror and one of said fixed electrodes of said first set such that said mirror starts the vibration from an original position, and stops said application of said pulse voltage when one of said end portions of said mirror reaches said one fixed electrodes.

15. A light beams scanner according to claim 14, wherein said voltage applying unit applies said pulse voltage to said electrode section of said mirror and said one fixed electrode of said first set immediately before said one end portion of said mirror returns to said one fixed electrode and stops said application of said pulse voltage when said one end portion of said mirror returns to said original position.

16. A light beams scanner according to claim 15, wherein said voltage applying unit applies said pulse voltage to said electrode section of said mirror and the one of said fixed electrodes of said first set when said one end portion of said mirror returns to said original position and stops said application of said pulse voltage when the other of said end portions of said mirror reaches said other fixed electrode of said first set.

* * * * *